(12) United States Patent
Lu et al.

(10) Patent No.: US 10,003,485 B2
(45) Date of Patent: Jun. 19, 2018

(54) SYSTEMS OF SYNCHRONIZING LIGHTING EFFECT CONTROL SIGNALS AND PATTERNS FOR CONTROLLING INTERACTIVE LIGHTING EFFECT DEVICES

(71) Applicant: LUMIC TECHNOLOGY INC., Zhubei (TW)

(72) Inventors: Ying-Ko Lu, Zhubei (TW); Ta-Wei Huang, Zhubei (TW); Ta-Jen Lin, Zhubei (TW); Chih-Ming Chang, Zhubei (TW); Wen-Chih Wang, Zhubei (TW)

(73) Assignee: LUMIC TECHNOLOGY INC., Zhubei (TW)

( * ) Notice: Subject to any disclaimer, the term of this patent is extended or adjusted under 35 U.S.C. 154(b) by 0 days. days.

(21) Appl. No.: 15/791,350

(22) Filed: Oct. 23, 2017

(65) Prior Publication Data
US 2018/0049287 A1 Feb. 15, 2018

Related U.S. Application Data

(63) Continuation-in-part of application No. 15/413,435, filed on Jan. 24, 2017, now Pat. No. 9,913,344.

(60) Provisional application No. 62/413,963, filed on Oct. 27, 2016, provisional application No. 62/286,446, filed on Jan. 25, 2016.

(51) Int. Cl.
F21V 33/00 (2006.01)
H04L 27/10 (2006.01)
H04L 12/24 (2006.01)
F21K 9/238 (2016.01)

(52) U.S. Cl.
CPC .............. H04L 27/10 (2013.01); F21K 9/238 (2016.08); H04L 41/08 (2013.01)

(58) Field of Classification Search
CPC .......... H04L 27/10; H04L 41/08; F21K 9/238
See application file for complete search history.

(56) References Cited

U.S. PATENT DOCUMENTS

2012/0274670 A1* 11/2012 Lee ...................... H05B 37/029
345/690
2012/0312874 A1* 12/2012 Jonsson ............. H05B 37/0245
235/385

(Continued)

Primary Examiner — Evan Dzierzynski
(74) Attorney, Agent, or Firm — Ding Yu Tan

(57) ABSTRACT

A system for synchronizing lighting effect patterns of interactive lighting effect devices at a remote location with respect to those at local location is disclosed herein. Synchronized lighting effects produced at the remote location while watching a lighting effect show using other interactive lighting effect devices illuminated according to a script at event venue, can be achieved. Such synchronized lighting effects obtained at remote location generate a corresponding virtual simulated perception of attending same concert venue live when watching a live streaming video thereof. Low latency between lighting effect changes are produced at remote location with respect to those observed in concert venue live streaming video due to method of color control signal generation along with usage of color control pattern blending module that creates a blended video frame comprising of a color control pattern, which allows for efficient lighting effect pattern generation at remote location.

13 Claims, 14 Drawing Sheets

(56) References Cited

U.S. PATENT DOCUMENTS

| | | | |
|---|---|---|---|
| 2013/0334971 A1* | 12/2013 | Jones | H05B 37/0218 315/151 |
| 2014/0113598 A1* | 4/2014 | Conti | G06F 3/1446 455/414.1 |

* cited by examiner

Illustrative example of zone partitions in a venue event

Illustrative example of zone codes of the venue event stored in each interactive lighting effect device

| Zone | Zone Code (ZC) |
|---|---|
| Zone A | 0x10 |
| Zone B | 0x11 |
| Zone C | 0x12 |
| Zone D | 0x13 |
| Zone E | 0x14 |
| Zone F | 0x15 |
| Zone G | 0x16 |

PRIOR ART

FIG. 3

Example 3

R of color control signal is: 255
G of color control signal is: 0
B of color control signal is: 128
ZC of color control signal is: 30 color control signal data vector at the remote location

SYSTEMS OF SYNCHRONIZING LIGHTING EFFECT CONTROL SIGNALS AND PATTERNS FOR CONTROLLING INTERACTIVE LIGHTING EFFECT DEVICES

FIELD OF THE INVENTION

The present invention generally relates to a system for synchronizing lighting effect patterns and lighting effect control signals for interactive lighting effect devices and, more particularly, to a method and system for synchronizing lighting effect patterns and lighting effect control signals of interactive lighting effect devices located at a remote location while watching a video streaming broadcast of a live venue event at a first location, so as to produce synchronized dynamic and interactive lighting effects and to achieve simulated perception of attending same live venue event.

BACKGROUND OF THE INVENTION

Interactive lighting effective devices, such as, for example, LED wristbands are popular portable electronic devices used for achieving interactive mass-scaled lighting effects in various venue events such as at a musical concert, a sporting event, a mass gathering, a church event, a political gathering, an educational institution convention, when the interactive lighting effect devices are being operated in a coordinated illuminating patterns to produce continuous illuminating visual effects on a mass scale. The interactive lighting effective devices, such as, the LED wristbands or handheld LED glow sticks can be remote-controlled wirelessly under radio frequency signal broadcasts, by using a RF transmitter, a lighting controller and a proprietary control software on laptop or PC. For the sake of allowing more people who may be also wearing LED wristbands but are located at different other (remote) locations to also (virtually) participate and achieving simulated perception or experience the same light effect show by having synchronized lighting effects with respect to those other LED wristbands which are worn by attendees controlled and located at a concert venue (i.e. the actual concert attendee is wearing the LED wristband sitting in a seat that is located inside the concert venue itself), various conventional systems have been developed. Therefore, people who cannot attend the concert venue in person, can still nevertheless enjoy the same synchronized lighting effect experience from their wristbands worn while watching the concert venue through a live streaming video of the concert venue. For example, a conventional method of configuring synchronized lighting effect patterns of LED wristbands of live concert event at a remote viewing location was discussed in US patent application publication number 20140184386 by Jason Charles Regler et al, of Publication Date: Jul. 3, 2014, which explains that in certain embodiments, a circuitry contained within the wristband may include a timer or clock coupled to a controller, and this clock may be used to synchronize lighting effects, so that this programmed clock can be used to synchronize output of lights from multiple LED wristbands. Meanwhile, a battery isolation tab may, however, be pulled at time of entry in the venue, with the wristband's controller configured to provide a preset flash sequence to notify the user that the wristband is functional. Therefore, above patent publication describes a time-based trigger and a suitable crystal within the wristband are utilized to permit the viewing of the concert via a television or computer relay and experience perceived association (i.e. a sense of virtual presence at the concert event itself while watching it on a TV screen at a remote location). However, there are several drawbacks associated with the above conventional method of configuring synchronized lighting effect patterns of live concert event at a remote viewing location, namely the following: (1) once there is an inadvertent time delay that has occurred during a starting period at the concert location, the clock on every wristband cannot self-adjust for the time delay, and therefore would be triggered for actions at wrong times/intervals. Therefore, additional efforts are required to calibrate or adjust the clock for each wristband in advance ahead of time before the concert begins when a time delay is expected or predicted at the concert location, which would require of time and effort to perform; (2) as soon as the concert starts, although it is possible to notify an user to pull the battery tab to start the timer to be used to synchronize the lighting effects, however, actual performance time on every section of lighting effect script for the concert is sometimes dynamically changed, therefore because it is almost impossible to perfectly follow the prearranged time schedule on every section of script during all the performance time, thus the lighting effects produced on all wristbands would no longer be in perfect sequentially timed order whenever dynamically changes are introduced; (3) any time lag that occur during actual playback of the video, such as due to broadcast interruption or video streaming buffering delays would create a significant timing discrepancy between the clock at the wristband versus the original preset clock for the controller at the concert event.

Therefore, there is a need in the related art in providing a more efficient and effective method and system for dynamically synchronizing lighting effect patterns and light effect control signals to control interactive lighting effect devices located at different locations so as to produce cross-location/inter-location synchronized light effects for a lighting effect show spanning multiple locations without having to experience any significant time lag at remote location with respect to the event venue location.

SUMMARY OF THE INVENTION

The present invention provides a system for synchronizing lighting effect patterns and lighting effect control signals for interactive lighting effect devices at a remote location with respect to those at a live venue event located at a first location.

The present invention provides that a total number of the interactive lighting effect device can be one or more, and that the interactive lighting effect control system can efficiently and effectively manage and handle a large number of the interactive lighting effect devices upwards of a million or more.

The present invention provides the interactive lighting effect device having at least one light source, the controller is configured to cause the at least one light source of the interactive lighting effect device selectively to emit light in accordance with a received illuminating color sequence data for providing continuous automated and coordinated lighting effect.

The present invention provides the received illuminating color sequence data comprising a plurality of prearranged illuminating intensities of red, green and blue light emitting diodes (LEDS) corresponding to the zone codes in sequential data burst timing.

The present invention provides a plurality of light emitting diodes (LEDs) having at least colors of red, green and blue for the light sources in each interactive lighting effect portable light illuminating device, in which illuminating intensity of the red, green and blue LEDS are configured in accordance with red, green and blue color codes (R, G, B) ranging from 0 to 255, respectively.

The present invention provides illuminating states of the light source comprising on, off, or flashing for the interactive lighting effect portable light illuminating device.

The present invention provides two or more interactive lighting effect devices that are capable of receiving the same set of illuminating color and zone assignment data to cause the light sources thereof selectively to be illuminating with the same color.

The present invention provides the zone codes to be assigned for seating location by seating zone.

The present invention provides the set of illuminating color data comprising illuminating intensity of the red, green and blue LEDS corresponding to the zone code.

The present invention provides the interactive lighting effect device in various configurations, such as, for example, a smartphone, an illuminating LED wristband, an illuminating LED necklace, a handheld LED glow stick, an LED bangle, a LED bracelet, a glowing head band, a glowing eyewear, or a set of LED gloves.

The present invention provides an interactive lighting effect control system configured and adapted for use together with the interactive lighting effect devices, in which the interactive lighting effect control system includes a mobile device, such as a smartphone, which includes a camera serving as a video recorder, and also contains a wireless transmitter, a memory, and a processing unit therein, and the interactive lighting effect control system also includes a lighting controller according to one embodiment. In addition, according to alternative embodiments, the interactive lighting effect control system may include individual electronic devices such as PC, laptop, wireless electronic device, etc, which serve and function as the video recorder, the color control pattern blending module, the lighting controller, the wireless transmitter, and/or the memory, respectively.

The lighting controller generating a color control signal, in which the color control signal comprising an illuminating color and zone assignment data. The lighting controller is coupled to the memory of the wireless transmitter, the color control signal is transmitted from the lighting controller to the wireless transmitter, and the wireless transmitter is an RF transmitter configured to broadcast the color control signal in a plurality of the second RF data bursts in sequential order. The at least one wireless receiver is configured to intercept and respond to the second RF data bursts broadcasted from the wireless transmitter upon verifying the authenticity thereof.

The present invention provides redundant RF data bursts to be sequentially broadcasted at the time $t_n$ and at the time $t_{n+1}$ comprising of the same redundant zone code signal in consecutive RF data bursts to the interactive lighting effect device, for ensuring data transmission integrity.

The present invention provides a method comprising of steps using the interactive lighting effect control system for dynamically configuring lighting effect patterns for the interactive lighting effect device which can be located at a venue event to produce dynamic lighting effects on a mass scale.

The present invention provides a method for dynamically wirelessly configuring zone code to each of the interactive lighting effect devices through RF data bursts upon completion of authentication of the interactive light effect device.

Some of the advantages of the method and system for synchronizing lighting effect patterns and lighting effect control signals of interactive lighting effect devices which are located at multiple locations include the following: (a) achieving very low latency between the lighting effect changes produced at the remote location with respect to the lighting effect changes observed in video frames of current live streaming video of the concert venue. In other words, lighting effect changes produced at the remote location would successfully synchronize with corresponding lighting effect changes seen from live streaming of concert venue at the remote location; (b) the synchronization of light effect patterns and lighting effect control signals require of no extra or additional equipment because of the fact that implementation can be easily achieved by existing equipment for serving as the video recorder, and the video image blending for the color control pattern blending module; (c) overall lighting effect synchronization performance is ensured or facilitated regardless of amount of actual distance between the remote location from the concert venue.

BRIEF DESCRIPTION OF THE DRAWINGS

The present invention will become more readily apparent to those ordinarily skilled in the art after reviewing the following detailed description and accompanying drawings, in which:

FIG. 3 shows an illustrative example of zones codes listed with respect to specific seating zone regions as found in prior art.

DETAILED DESCRIPTION OF PREFERRED EMBODIMENTS

Figure 1:
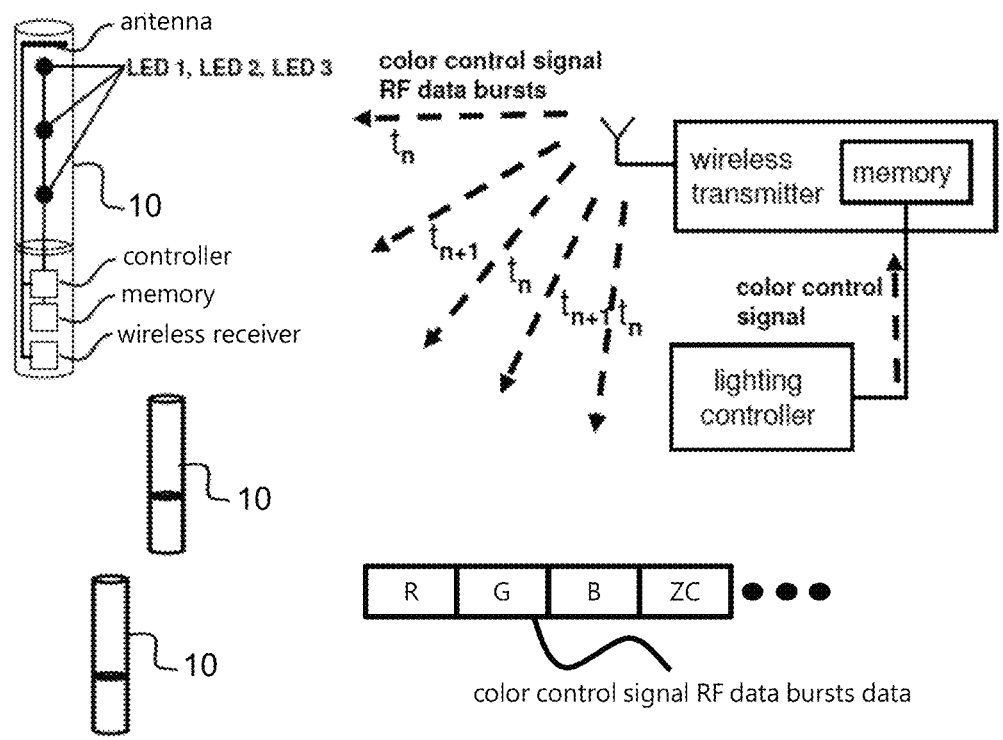
FIG. 1 shows a block diagram of a conventional system for synchronizing lighting effect patterns and lighting effect control signals of a plurality of interactive lighting effect devices using color control signal RF data bursts.

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Several terms or phrases are used throughout the present disclosure with the following definitions, such as, the following:

A synchronized lighting effect control signal has the following defined meanings: when a series of lighting effect control signals are generated in sequence according to a concert's script to wirelessly control interactive lighting effect devices held by audience members at a local location of a live concert A, the audience members who located at a remote location and are also holding interactive lighting effect devices, through viewing of the streaming video of the live concert A, will experience substantially the same timing of lighting effect control changes on their interactive lighting effect devices as those as seen in the streaming video on the interactive lighting effect devices experienced by the audience member at the local location of the live concert A.

A color control pattern is defined as follow: is an image-based pattern generated by a color control pattern generated unit. The color control pattern is used to achieve synchronized lighting effect control signal to control the interactive lighting effect devices at the remote location. The color control signal data is mapped onto the color control pattern as R, G, B color value. Then the color control pattern blends with raw video images to be shown on a video frame of live streaming video.

Referring to the disclosure in US Patent Publication Number 20170048951 with publication date of Feb. 16, 2017 (herein referred also as US-Pub 20170048951), an interactive lighting effect portable light illuminating device (herein referred to also as, an interactive lighting effect device, for short), an interactive lighting effect control system, a plurality of LED light sources operationally responsive to change an illuminating state thereof, wireless data transmission in the form of RF data bursts from the interactive lighting effect control system comprising illuminating color and zone assignment data, illuminating color and zone assignment sequence data file comprising a plurality of prearranged illuminating intensities of red, green and blue light emitting diodes (LEDS) and the nested hierarchical zone codes of the zone regions in sequential data burst timing, a plurality of light emitting diodes (LEDs) having at least colors of red, green and blue for the light sources, along with various other teachings and techniques can all be incorporated along the embodiment of present invention, as to be effectively adapted for usage in embodiments of present invention.

The present invention provides illuminating states of the light source comprising on, off, or flashing for the interactive lighting effect portable light illuminating device.

The present invention provides interactive lighting effect portable light illuminating device in various structures and configurations, such as, for example, an illuminating LED wristband, an illuminating LED necklace, or a handheld LED glow stick.

Based upon disclosure of US Patent Publication Number 20170048951, the present invention also provides an interactive lighting effect control system configured and adapted for use together with the interactive lighting effect portable light illuminating devices, in which the interactive lighting effect control system comprising a wireless transmitter comprising a memory and at least one lighting controller, the at least one lighting controller generating a color control signal, the color control signal comprising an illuminating color and zone assignment data, the lighting controller is coupled to the memory of the wireless transmitter, the color control signal is transmitted to the wireless transmitter, the wireless transmitter is an RF transmitter configured to broadcast the color control signal in a plurality of RF data bursts in sequential order, and at least one wireless receiver, the at least one wireless receiver is configured to intercept and respond to the RF data bursts broadcasted from the wireless transmitter upon verifying the authenticity thereof. Each of the RF data burst comprising the illuminating color and zone assignment data for the at least one wireless receiver having a memory therein storing at least one zone region indexed by one or more nested hierarchical zone codes, the wireless transmitter to be initiating sequential broadcasting at a time $t_n$ of one color control signal in one RF data burst to the interactive lighting effect portable light illuminating device, and initiating sequential broadcasting at a time $t_{n+1}$ of another color control signal in another RF data burst to the interactive lighting effect portable light illuminating device, upon receiving of the RF data burst for the color control signal by the interactive lighting effect portable light illuminating device, a controller therein performing authentication verification of an identification code from the illuminating color and zone assignment data of the received RF data burst of the color control signal and inspecting whether the identification code of the color control signal after calculation is correct or not, and initiating change of illuminating color of a plurality of LEDs in the interactive lighting effect portable light illuminating device in accordance with the color control signal comprising a plurality of illuminating colors for a plurality of light sources of the interactive lighting effect portable light illuminating devices defined by a set of red, green, and blue (R, G, B) color codes.

The present invention provides the wireless receiver to be configured and disposed in the interactive lighting effect portable light illuminating device.

The present invention provides redundant RF data bursts to be sequentially broadcasted at the time $t_n$ and at the time $t_{n+1}$ comprising of the same redundant color control signal in consecutive RF data bursts to the interactive lighting effect portable light illuminating device.

In the embodiments of present invention, the following features or resources are provided: the illuminating states of the light source include on, off, or flashing. In other words, any number of red, green and blue light emitting diodes (LED1, LED2, LED3) can be turned on or powered on, turned off or powered off, or flashing on and off in repeating pattern with a specified frequency (i.e. 2 times per second). Turning on means or entails that at least one of the R, G, B color codes is not zero. Turning off means that all of the R, G, B color codes are set to be zero, or that the dimmer color code is set to zero. The color for the flashing on/off can be set by the corresponding R, G, B color code data. Meanwhile, the flashing frequency can be configured or set by the controller of the interactive lighting effect portable light illuminating device to be given a preset flashing frequency value, i.e. 2 flashings/second, or through generating a random number by the controller. The wireless data transmissions from the wireless transmitter to the wireless receiver can be performed by RF data bursts or alternatively, Wi-Fi, Bluetooth or ZigBee transmissions, to name a few. The interactive lighting effect device can be an illuminating LED wristband, an illuminating LED necklace, or a handheld LED glow stick, but is not limited to these options, and can be adapted to other types of illuminating devices with wireless communication capability.

Figure 2:
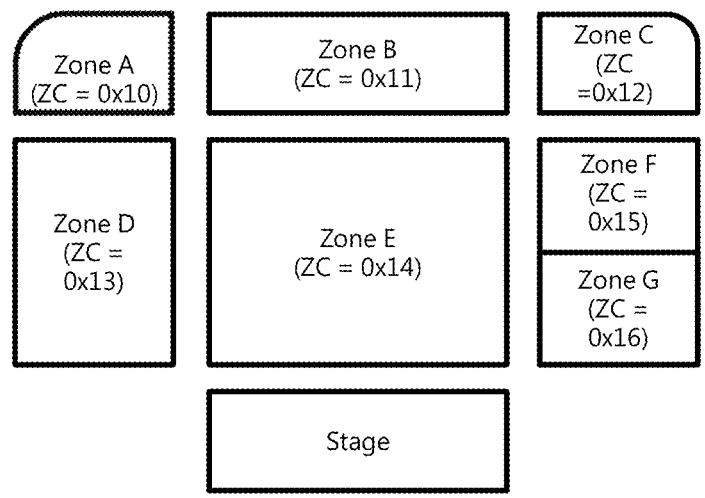
FIG. 2 shows an illustrative example of a layout diagram of zone code allocation arrangement for seating zones in a venue event according to a conventional method.
Figure 4:
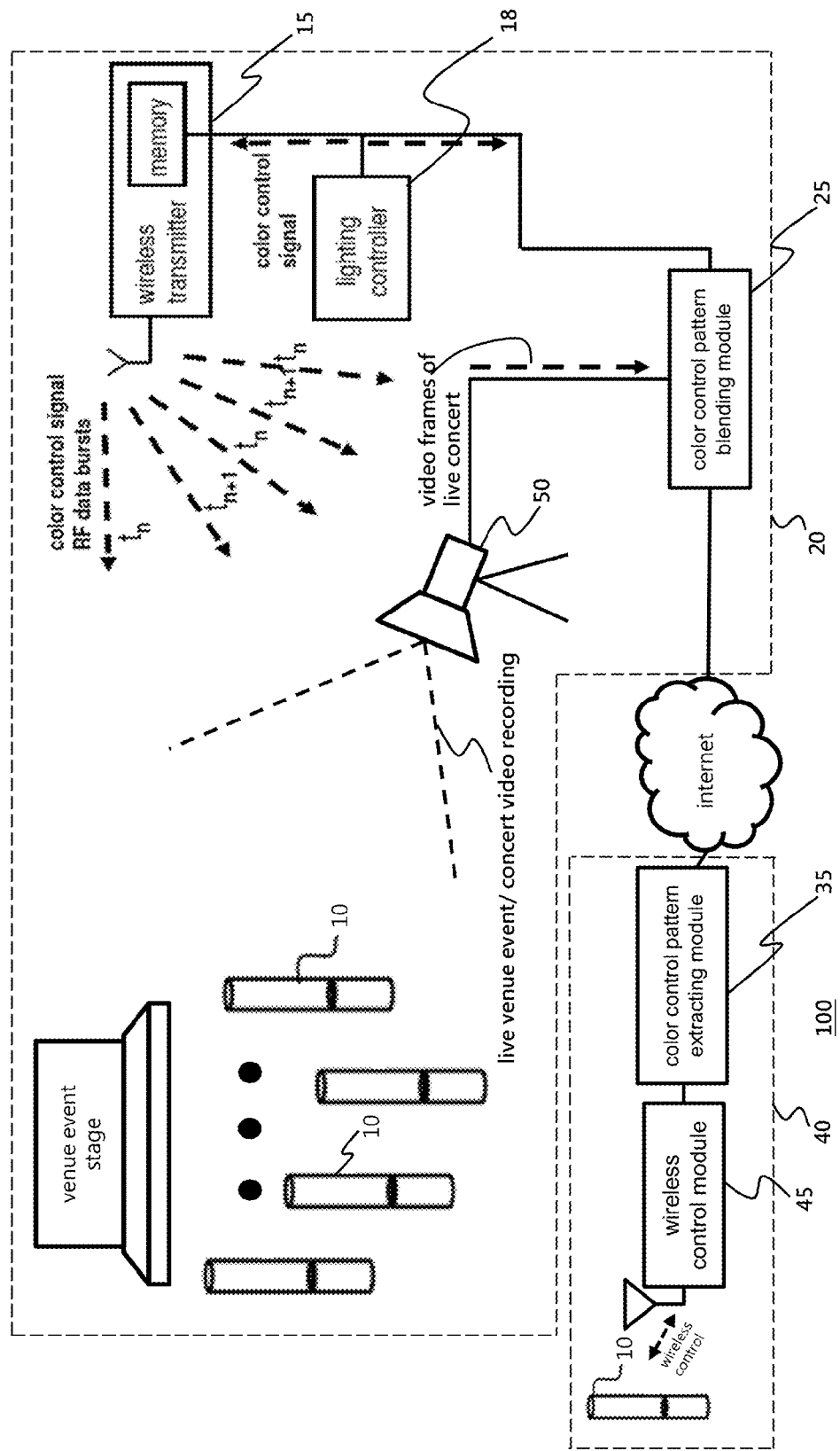
FIG. 4 shows a block diagram of a system for synchronizing lighting effect patterns and lighting effect control signals of a plurality of interactive lighting effect devices which are located at a second location with respect to the interactive lighting effect devices located at a first location, respectively, according to an embodiment of present invention.

As shown in FIG. 4, a system 100 for synchronizing lighting effect patterns and lighting effect control signals of a plurality of interactive lighting effect devices 10 which are located at a second location 40 with respect to the interactive lighting effect devices 10 located at a first location 20, respectively, includes the following: a video recorder 50, which comprising a camera; a lighting controller 18; a wireless transmitter 15 and a color control pattern blending module 25; a color control pattern extracting module 35; and a wireless control module 45. In the above-mentioned system 100, as also shown in FIG. 1 (and explained in greater details in US-Pub 20170048951) each of the interactive lighting effect devices 10 comprising a memory having stored therein a zone region indexed by a zone code within the color control signal RF data bursts data, a wireless receiver configured to capture the RF data burst from the wireless transmitter, a controller responsive to the RF data burst, and is coupled to the memory, and at least one light source (LED1, LED2, LED3) disposed therein being operationally responsive to the controller to change an illuminating state therein, wherein the at least one light source comprising a plurality of light emitting diodes (LED1, LED2, LED3) having at least colors of red, green and blue, and illuminating intensity of the red, green and blue LEDS are configured in accordance with red, green and blue color codes (R, G, B) ranging from 0 to 255, respectively. In the illustrated embodiment, a color control signal is generated and a current video frame is captured at the first location 20, the first location 20 can be a live event venue, the color control signal is obtained from a lighting change script of the live event venue and the current video frame containing an image comprising of a plurality of illuminated interactive lighting effect devices 10 located at the first location 20, the color control signal is sent to the color control pattern blending module 25 located at the first location 20 through direct wiring connection or by wireless transmission via RF data burst broadcasts, and a blended video frame comprising of a color control pattern blended with the current video frame of the live event venue using the color control pattern blending module 25 is produced and transmitted to a live streaming server via internet, which in turn, then transmits the blended video frame to a color control pattern extracting module 35 disposed at the second location 40, which in turn extracts the color control pattern and the color control signal from the blended video frame to control the illuminating state of the interactive lighting effect devices 10 at the remote location 40 to form a lighting effect pattern. As shown in FIG. 1, the color control signal includes data for the R, G, B color codes and the zone code. As shown in illustrated example of FIGS. 2 and 3, the zone codes to be stored in the interactive lighting effect devices are matched to each of the zone partitions (or seating location regions) in a venue event. In the illustrated embodiment of FIG. 4, the second location 40 can be one or more of remote location 40 that is broadcasting the blended video frame, and the color control pattern extracting module 35 can be coupled to the wireless control module 45 at the second location 40 for wireless transmitting the color control signal to the interactive lighting effect devices 10 at the remote location 40. The illuminating state of the light source comprising on, off, or flashing in the interactive lighting effect devices 10, respectively, so as to produce lighting effects changes when illuminated together. In other embodiments (not shown), the RF data burst can be replaced by wireless data bursts under Wi-Fi, Bluetooth or ZigBee. In the illustrated embodiment of FIGS. 1 and 4, two or more interactive lighting effect devices 10 that are preconfigured with the zone code stored in the memory thereof to be the same are capable of receiving the same set of pattern-related data for lighting effect to cause the light sources selectively to be illuminating in accordance with a same illuminating color data. The interactive lighting effect device 10 can be an illuminating LED wristband, an illuminating LED necklace, an LED bangle, a LED bracelet, a glowing head band, a glowing eyewear, a set of LED gloves, or a handheld LED glow stick. Furthermore, the interactive lighting effect device 10 can also include a drone configured with LED lighting. In addition, the interactive lighting effect device 10 can be different types of devices combined together, i.e. a group of LED light sticks and a group of drones with LED can be disposed inside the first location 20, and/or the second location 40, respectively.

As shown in FIG. 4, the video recorder 50 can be a conventional digital camera, such as Sony® HDR-series digital camera, or a mobile device with a camera module. The color control pattern blending module 25 includes the following components: (1) a color control pattern generating unit, which can be a PC, laptop or mobile device running a pattern generating program therein; (2) a video image blending unit, such as Sony® MCX-500 vision mixer, or a PC, laptop or mobile device that is running image blending program therein; (3) a memory (not shown); and (4) an uploading unit, which can be used to compress and upload video to Internet, and can be implemented by, for example, a PC, laptop or mobile electronic device. In other words, the color control pattern blending module 25 is a device or module used to generate the color control pattern according to the color control signal, blend the color control pattern with the video frame, and to upload the video frames to internet after the video blending is finished. The color control pattern blending module 25 including of the color control pattern generating unit, the video image blending unit, and the uploading unit, can be implemented and realized by means of configuring a set of computer program residing on a PC, a smartphone, and/or by adding configuration algorithms in driver source file for an embedded system, and/or by adding compiled coding/program to microprocessor . . . etc.

As further shown in FIG. 4, the wireless transmitter 15 can be the same wireless transmitter as disclosed in US-Pub 20170048951. The color control pattern extracting module 35 includes the following components: (1) a downloading unit (not shown), which can be a PC, laptop or mobile electronic device that is configured to be capable of downloading video from internet; (2) a video image extracting unit (not shown), which can be a PC, laptop or a mobile electronic device that run a program capable of decompressing the video, and also run a program to extract a color value of a color control pattern. In other words, the color control pattern extracting module 35 is an electronic module or device configured and adapted to be used to download video image frames from internet, and to extract the color control pattern and the color control signal to control the illuminating state of the interactive lighting effect devices 10 at the remote location 40. The color control pattern extracting module 35 including of the downloading unit and the video image extracting unit, can be implemented by means of configuring a set of computer program residing on a PC, a smartphone, and/or by adding configuration algorithms in driver source file for an embedded system, and/or adding compiled coding/program to microprocessor . . . etc. In the illustrated embodiment, the wireless control module 45 includes the following components: (1) a lighting controller (not shown), which can be a PC, laptop or mobile that is configured to receive the extracted color value of color control pattern and copy it to a data structure as the color control signal vector at the remote location used to control interactive lighting effect devices; and (2) a wireless transmitter (not shown, but is the same wireless transmitter as found in US-Pub US 20170048951). The uploading unit (not shown) belonging to the color control pattern blending module 25 is configured and adapted to be used to upload the blended video frames to online video streaming platform such as YouTube (www.youtube.com), Twitch (https://www.twitch.tv/) . . . etc. for users to live the live concert at the remote location. For bandwidth saving purpose, these video frames will be usually compressed before uploading to online video streaming platform.

Figure 8A:
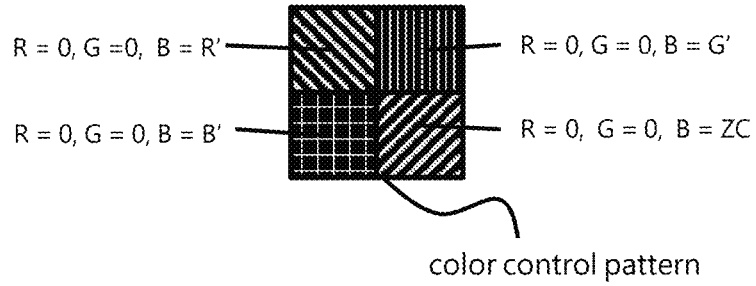
FIGS. 8A–8B show a plurality of illustrative examples of the color control pattern in accordance with the embodiment of present invention.
Figure 8A:
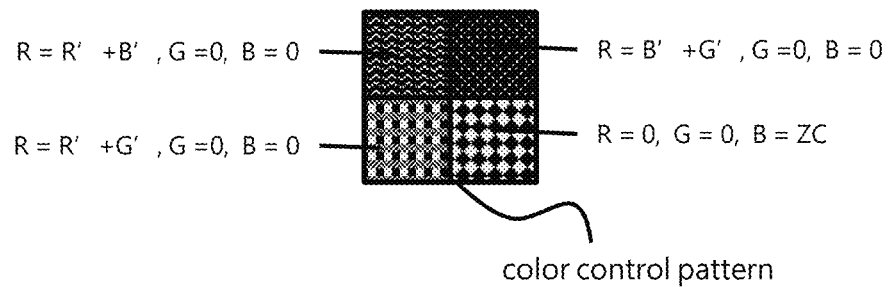
Figure 8B:
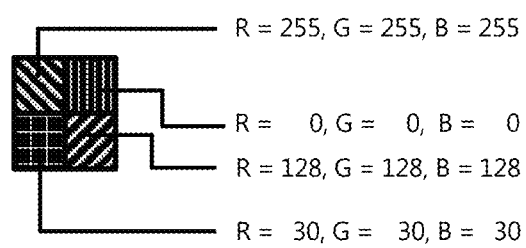
Figure 8B:
Figure 9:
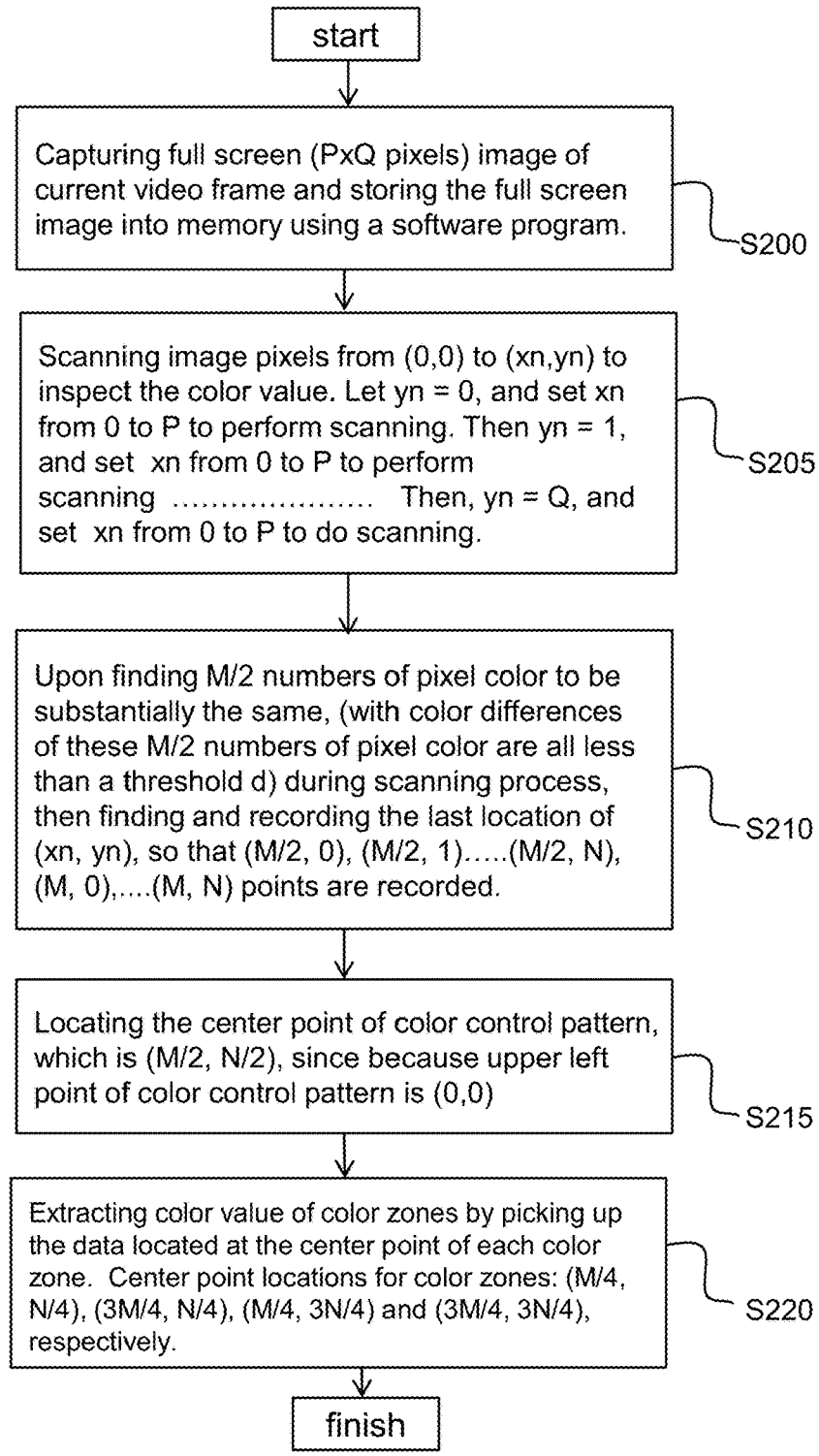
FIG. 9 shows a flow-chart diagram of a method for extracting a color control signal comprising of color values of color zones from the color control pattern using an algorithm according to an embodiment of present invention.

As shown in FIG. 9, a flow chart for a method for extracting color values directly from color control pattern in a current video frame (to find the color value of each zone by comparing the color value difference of a whole scanned image to find the color value of a center point of each color zone, in which the color control pattern has uniform regular shape/structure such as the four-zone square shown in the illustrated embodiment of FIGS. 8A-8B) includes the following steps: In step S200, a full screen (P×Q pixels) image of a current video frame is captured by a video recorder 50 and then stored into the memory therein using a software program. In step S205, image pixels from (0,0) to (xn,yn) are scanned to inspect the color value. For instance, yn is configured to be zero (0), and xn is configured or set from 0 to P to perform scanning. Then yn is set to be 1, and xn is configured from 0 to P to perform scanning. The same procedure is then repeated many times while yn is incremented each time by one (1) during each scanning. Later upon yn reaching Q, xn is then set or incremented from 0 to P to do scanning. In step S210, upon finding M/2 numbers of pixel color to be substantially the same color (i.e. substantially the same color can be defined by color difference of these M/2 numbers of pixel color to be less than a threshold d) during scanning process, the last image location of (xn, yn) can then be found and recorded, so that (M/2, 0), (M/2, 1) . . . (M/2,N), (M,0), . . . (M,N) points are respectively recorded. In step S215, a center point of the color control pattern, which is (M/2, N/2) is located, since because upper left point of color control pattern is (0,0). In step S220, the color values of the color zones are extracted respectively by picking up the image location data located at the center point of each color zone obtained, in which the center point image location for the color zones, are for example, (M/4, N/4), (3M/4, N/4), (M/4, 3N/4) and (3M/4, 3N/4), respectively, in the illustrated embodiment of FIGS. 5 and 8A.

In the illustrated embodiment, the color value extraction of each color zone by finding their center points is just an example for the sake of calculation convenience, nevertheless conventional techniques adopting pattern recognition algorithm are also available for dealing with color control patterns having irregular or non-uniform shapes, such as for example: a pattern recognition algorithm can be utilized to find a center point of a color control pattern on the scanned video image first. Then because the color control pattern is predesigned ahead of time, then according to the known size/dimensions of the color control pattern, the center point of the color control pattern and the known relative position of each color zone of the color control pattern are calculated or determined based on simple geometric relationship calculations. Later, color data for each color zone of the color control pattern is then extracted. For the aforementioned pattern recognition algorithm, a conventional open source algorithm described in "Feature Detection and Description section" of OpenCV (http://docs.opencv.org/3.0-beta/doc/py_tutorials/py_feature2d/py_table_of_contents_feature2d/py_table_of_contents_feature2d.html) can be consulted to find the feature of the object of an image and then find its corresponding center point. These algorithm include SIFT, SURF and BRIEF . . . etc.

Figure 6:
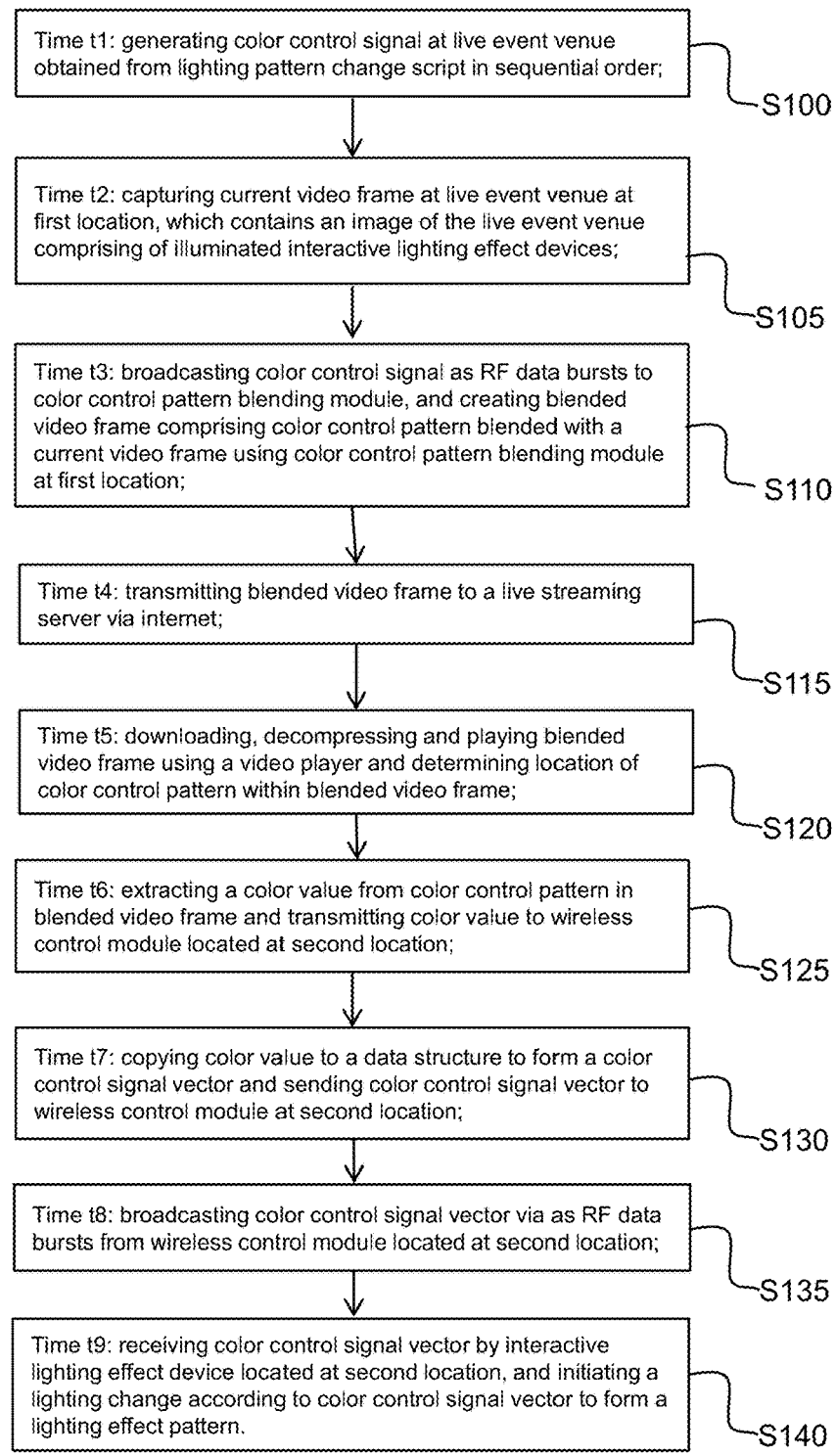
FIG. 6 shows a detailed flow-chart diagram of a method for synchronizing lighting effect patterns and lighting effect control signals of a plurality of interactive lighting effect devices located at a second location with respect to those located at a first location in accordance to an embodiment of present invention in accordance with different time points.

Referring to FIG. 6, a flow-chart diagram of a method for synchronizing a lighting effect pattern and a lighting effect control signal includes the following steps: In step S100, a color control signal is generated by a lighting controller at a live event venue located at a first location, in which the color control signal is obtained from a lighting pattern change script of the live event venue in a sequential manner. In step S105, a current video frame is captured at a live event venue located at the first location, in which the current video frame containing an image of the live event venue comprising of a plurality of illuminated interactive lighting effect devices. In step S110, the color control signal is broadcasted wirelessly via a wireless transmitter as a plurality of repeating RF data bursts, and the color control signal is received by a color control pattern blending module located at the first location, and a blended video frame comprising of a color control pattern blended with the current video frame of the live event venue using the color control pattern blending module is created. In step S115, the blended video frame is transmitted to a live streaming server via internet. In step S120, the blended video frame is downloaded, decompressed, and played using a video player and a location of the color control pattern within the blended video frame is determined. In step S125, a color value is extracted from the color control pattern in the blended video frame and the color value is transmitted to a wireless control module located at a second location. In step S130, the color value is copied to a data structure to form a color control signal vector and the color control signal vector is sent to the wireless control module located at the second location. In step S135, the color control signal vector is broadcasted via a wireless transmitter as a plurality of repeating RF data bursts from the wireless control module located at the second location. In step S140, the color control signal vector is received by an interactive light effect device located at the second location, and a lighting change is initiated according to the color control signal vector to form a lighting effect pattern. In an alternative embodiment, the step S110 can be replaced by the following step: the color control signal is sent directly to a color control pattern blending module located at the first location by a direct wiring connection, and a blended video frame is created comprising of a color control pattern blended with the current video frame of the live event venue using the color control pattern blending module. In the embodiments of present application, the color control pattern includes at least one zone inside the image of the live event venue, and the color control pattern includes color data comprising of R, G, B color values, of which a color value of each color zone of the color control pattern range from 0 to 255, respectively.

Figure 10A:
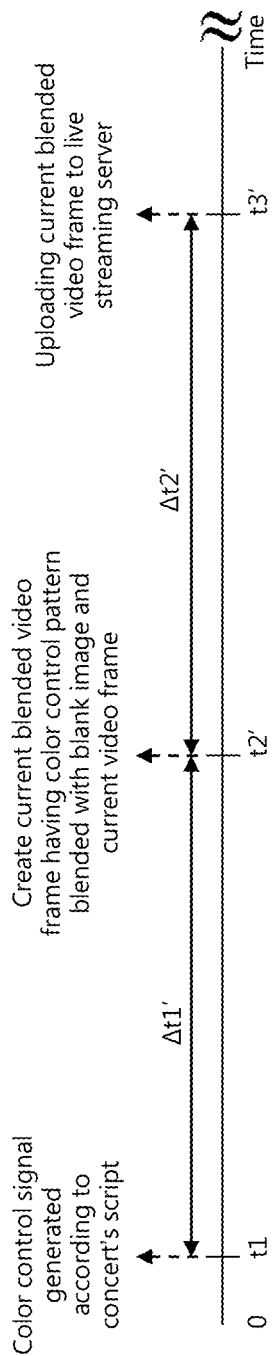
FIGS. 10A~10B show diagrams illustrating a process timing scheme including a latency (time lag) for the method for synchronizing lighting effect patterns and lighting effect control signals according to the embodiment of the present invention.
Figure 10B:
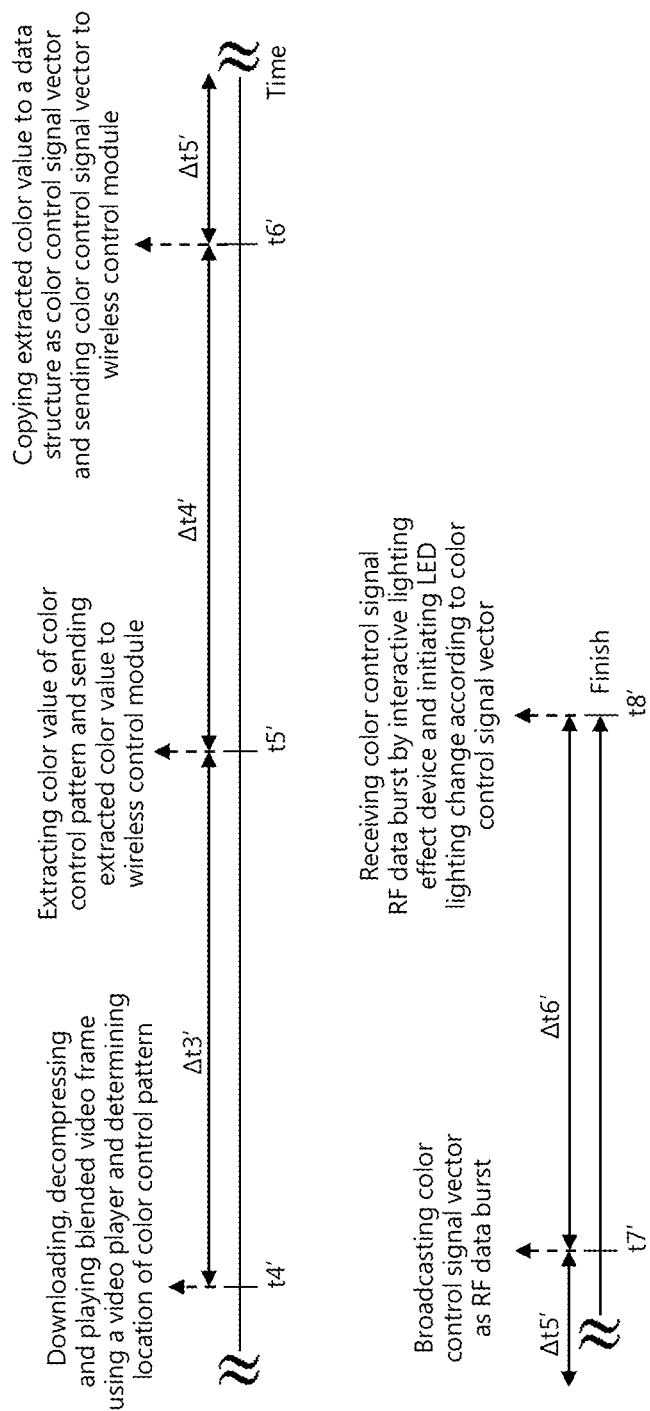
Figure 11:
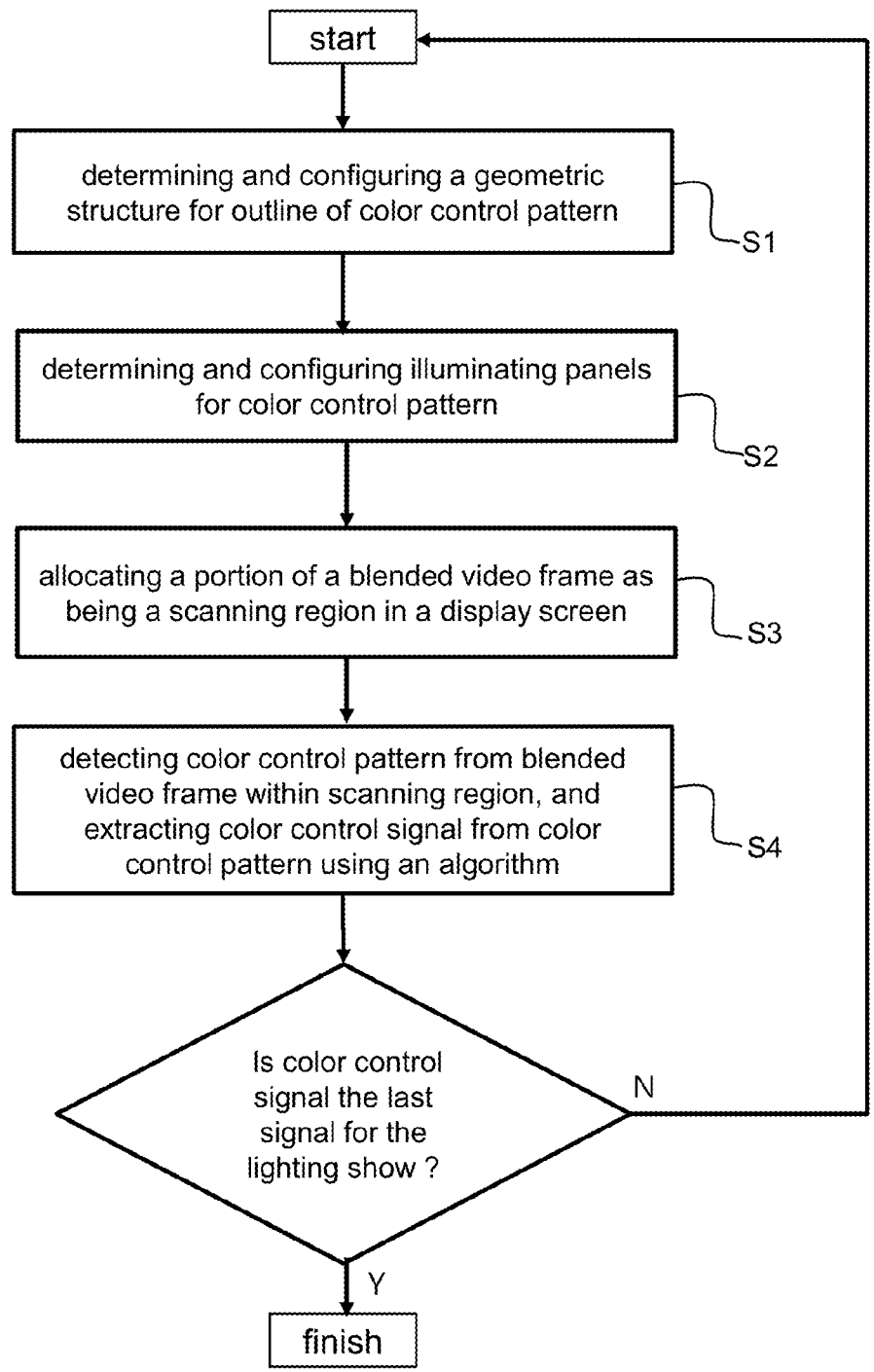
FIG. 11 shows a process flow diagram describing the utilization of a color control pattern extracting module for extracting the color control signal from the color control pattern in a blended video frame to control illuminating state of the interactive lighting effect devices at the remote location.
Figure 12:
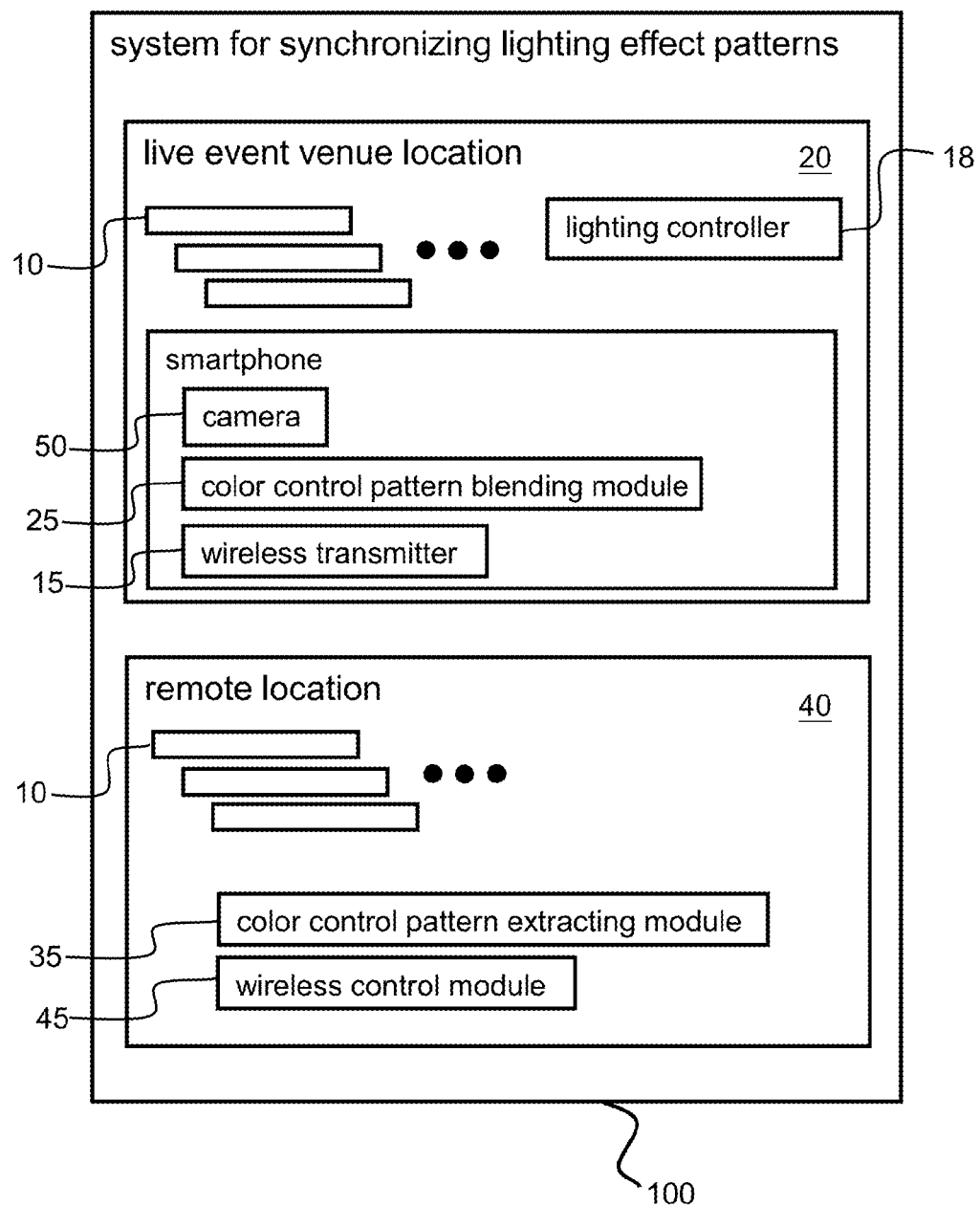
FIG. 12 shows an illustrative block diagram of the system for synchronizing lighting effect patterns and lighting effect control signals of the interactive lighting effect devices which are located at the remote location with respect to the interactive lighting effect devices located at a live event venue location.

Referring to FIGS. 10A-10B, a color control signal is generated, and a current video frame is captured at a live event venue located at a first location 20 at a time point t1, in which the color control signal is obtained from a lighting pattern change script of the live event venue in a sequential manner and the current video frame containing an image of the live event venue comprising of a plurality of illuminated interactive lighting effect devices 10. In the illustrated embodiment, the color control signal is broadcasted via a wireless transmitter 15 as a plurality of repeating RF data bursts to a color control pattern blending module 25 located at the first location 20, and creating a blended video frame comprising of a color control pattern blended with a blank image together with the current video frame of the live event venue using the color control pattern blending module 25 at a time point t2' (refer also to FIG. 5 for more details regarding the creation of the blended video frame and the color control pattern). Later, the blended video frame is transmitted to a live streaming server via internet at a time point t3'; the blended video frame is then downloaded, decompressed, and played using a video player, and a location of the color control pattern within the blended video frame is determined at a time point t4'; a color value from the color control pattern in the blended video frame is extracted, and the color value is transmitted to a wireless control module 45 located at a second location 40 at a time point t5'; the color value is then copied to a data structure to form a color control signal vector, and the color control signal vector is sent to the wireless control module 45 located at the second location 40 at a time point t6'; the color control signal vector is broadcasted via a wireless transmitter as a plurality of repeating RF data bursts from the wireless control module 45 located at the second location 40 at a time point t7'; and the color control signal vector is then received by an interactive light effect device 10 located at the second location 40, and a lighting change is initiated according to the color control signal vector to form a lighting effect pattern at a time point t8'; according to experimentation results, a latency (time lag) defined as being a time difference total calculated from a time point t4' to a time point t5' ($\Delta$t3'), a time point t5' to a time point t6' ($\Delta$t4'), a time point t6' to a time point t7' ($\Delta$t5'), and a time point t7' to a time point t8' ($\Delta$t6'), in the method for synchronizing a lighting effect pattern and a lighting effect control signal is determined or evaluated, which includes the following: the latency from the time point t4' to the time point t5' is less than 3 seconds for only a first lighting change of the color control signal vector, but is less than 1 millisecond for subsequent lighting changes of the color control signal vector; the latency from the time point t5' to the time point t6' is less than 1 millisecond, and from the time point t6' to the time point t7' is less than 1 millisecond for all lighting changes of the color control signal vector, respectively; the latency from the time point t7' to the time point t8' is less than 5 milliseconds for all lighting changes of the color control signal vector, respectively. In addition, the latency (time lag) calculated from the time point t4' to the time point t5', the time point t5' to the time point t6', the time point t6' to the time point t7', and the time point t7' to the time point t8' is under 8 milliseconds. However, because the above example is only just one embodiment, therefore, other examples with improved results for latency are also possible and included. Meanwhile, due to the fact that the time point t4' can be flexibly chosen in accordance with user preference with respect to the time point t3', therefore, latency is not defined or limited by the timing of time points t1, t2', and/or t3', respectively. In other words, user has the freedom to decide when to watch the video at the remote location, because it does not have to be in sequential order with respect to timing sequence shown by FIG. 10A.

Figure 5:
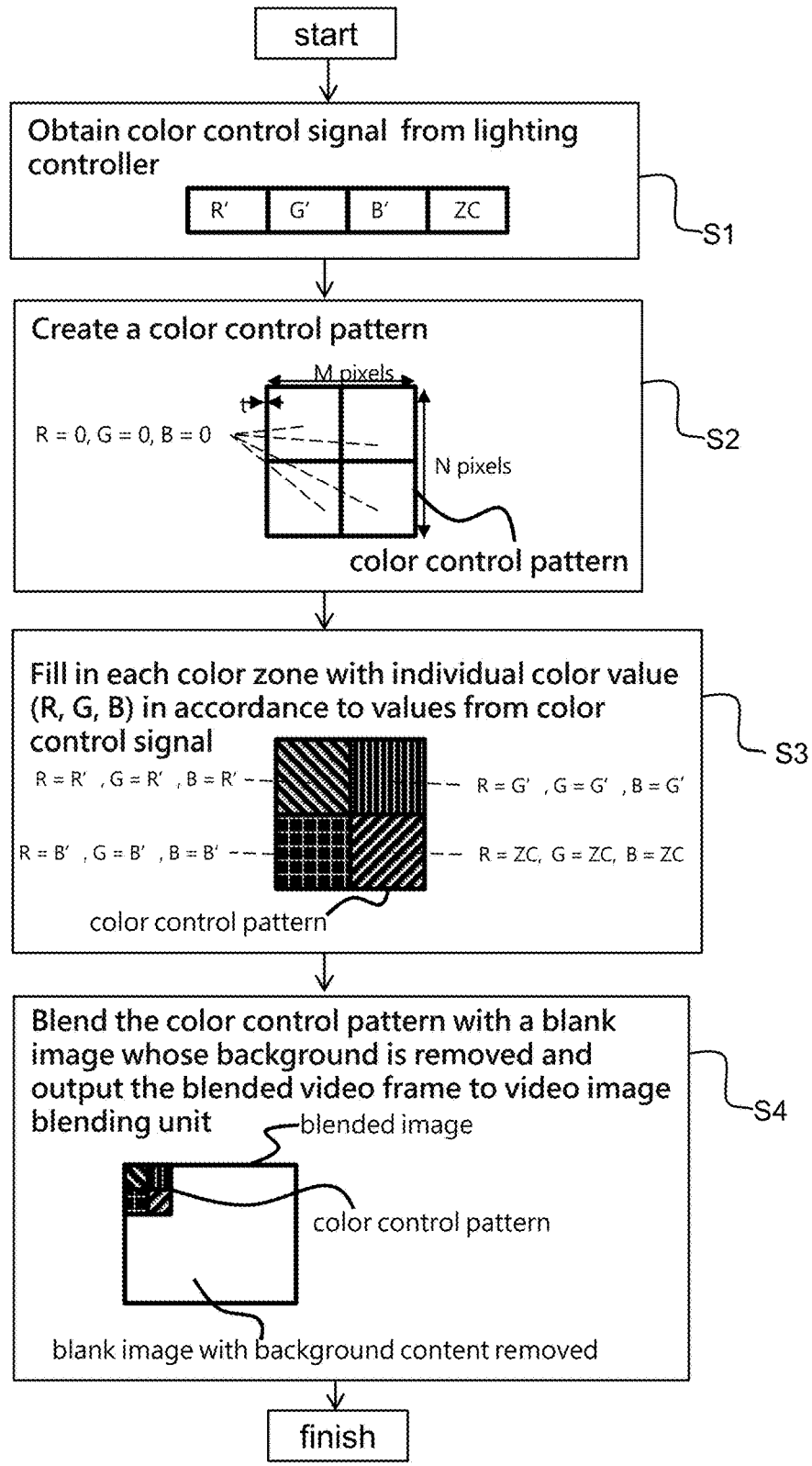
FIG. 5 shows an illustrated flow-chart diagram of a method for generating a color control pattern and a blended video frame from a color control signal from a light controller for controlling illuminating state of an interactive lighting effect device according to an embodiment of the present invention.

FIG. 5 shows an illustrated flow-chart diagram of a method for generating the color control pattern and the blended video frame from a color control signal from a light controller for controlling illuminating state of an interactive lighting effect device according to an embodiment of the present invention, which includes the following steps: In step S1, a color control signal is obtained from a lighting controller. In step S2, a color control pattern is created (i.e. R=0, G=0, B=0). In step S3, each color zone is filled in with individual color values (i.e. R, G, B) in accordance to data from color control signal (refer to FIG. 5 in step S3 for greater details). In step S4, the color control pattern is blended with a blank image whose background is removed and the blended video frame is outputted to a video image blending unit (refer to FIG. 5 in step S4 for greater details).

Figure 7:
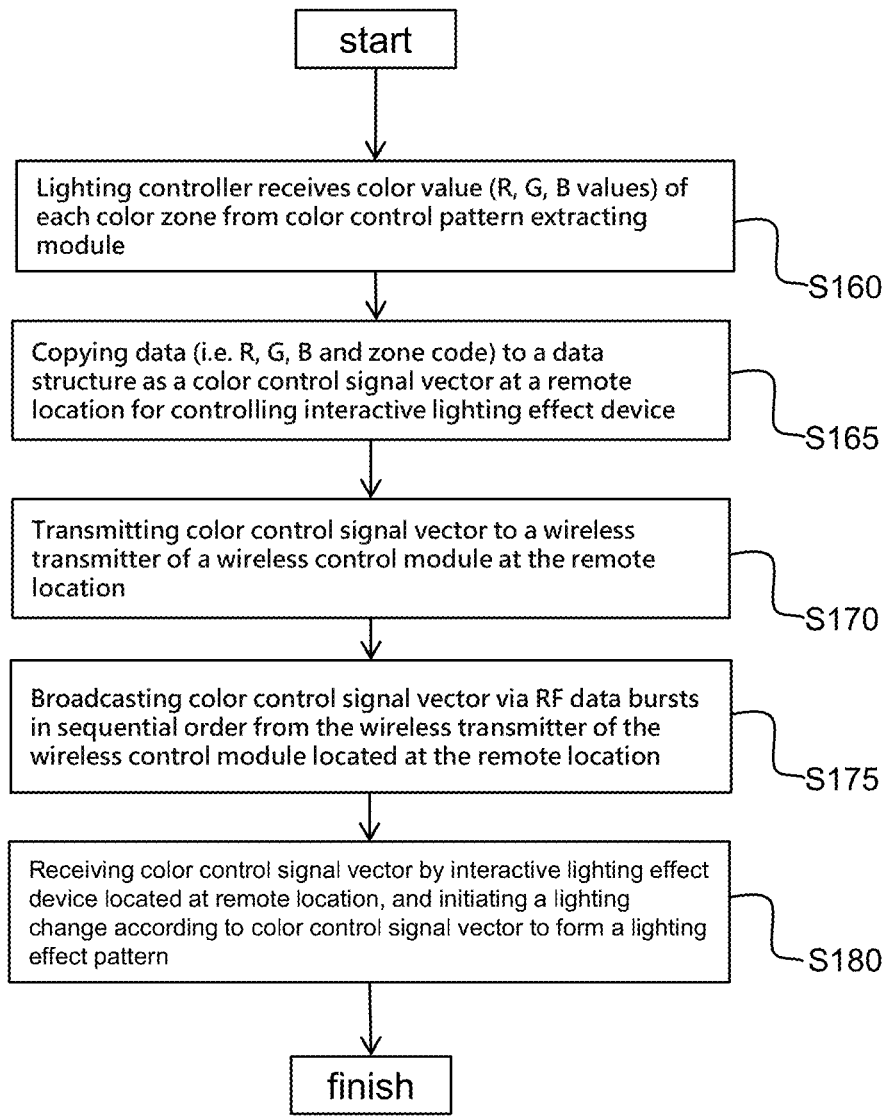
FIG. 7 shows a flow chart diagram of a method for producing lighting effect pattern changes and lighting effect patterns according to a color control signal vector for interactive lighting effect devices at a remote location.

Referring to FIG. 7, which shows steps for producing lighting effect patterns and lighting effect control signals at the remote location, including steps S160~S180, namely the following: in step S160, a lighting controller receives color values (ft G, B values) of each color zone from the color control pattern extracting module (matching to step S125 of FIG. 6). In step S165, data (i.e. R, G, B and zone code) is copied to a data structure as a color control signal vector at a remote location for controlling a plurality of interactive lighting effect devices (matching to step S130 of FIG. 6). In step S170, the color control signal vector is transmitted to a wireless transmitter of a wireless control module at the remote location (matching to step S130 of FIG. 6). In step S175, the color control signal vector is broadcasted via RF data bursts in sequential order from the wireless transmitter of the wireless control module located at the remote location (matching to step S135 of FIG. 6). In step S180, the color control signal vector is received by the interactive lighting effect device located at the remote location, and a lighting change is initiated according to color control signal vector to form a lighting effect pattern (matching to step S140 of FIG. 6).

Referring to FIG. 8B (example 3), which shows an illustrative example of a method for obtaining the color control pattern in accordance with the embodiment of present invention, in which four color zones having square shapes, includes color values of the following respectively:
  (first color zone) R=255, G=255, B=255;
  (second color zone) R=0, G=0, B=0;
  (third color zone) R=128, G=128, B=128;
  (fourth color zone) R=30, G=30, B=30.
The first square color zone sets R of the color control signal to be set to 255, while the second square color zone sets the G of the color control signal to be zero (0), the third square color zone sets the B of the color control signal to be 128, and the fourth square color zone sets the zone code (ZC) of the color control signal to be 30. Furthermore, FIG. 8A contains example 1 and example 2, which shows additional examples for obtaining the color control pattern.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for synchronizing a lighting effect pattern and a lighting effect control signal, comprising of steps of:
   step S1: generating a color control signal by a lighting controller at a live event venue located at a first location, wherein the color control signal is obtained from a lighting pattern change script of the live event venue in a sequential manner;
   step S2: capturing a current video frame at a live event venue located at the first location, wherein the current video frame containing an image of the live event venue comprising of a plurality of illuminated interactive lighting effect devices;
   step S3: broadcasting wirelessly the color control signal via a wireless transmitter as a plurality of repeating RF data bursts, and receiving the color control signal by a color control pattern blending module located at the first location, and creating a blended video frame comprising of a color control pattern blended with the current video frame of the live event venue using the color control pattern blending module;
   step S4: transmitting the blended video frame to a video streaming server via internet;
   step S5: downloading, decompressing and playing the blended video frame using a video player and determining a location of the color control pattern within the blended video frame;
   step S6: extracting a color value from the color control pattern in the blended video frame and transmitting the color value to a wireless control module located at a second location;
   step S7: copying the color value to a data structure to form a color control signal vector and sending the color control signal vector to the wireless control module located at the second location;
   step S8: broadcasting the color control signal vector via a wireless transmitter as a plurality of repeating RF data bursts from the wireless control module located at the second location; and
   step S9: receiving the color control signal vector by an interactive light effect device located at the second location, and initiating a lighting change according to the color control signal vector to form a lighting effect pattern.

2. The method of claim 1, wherein the step s3 is replace by sending the color control signal directly in a direct wire connection to a color control pattern blending module located at the first location, and creating a blended video frame comprising of a color control pattern blended with the current video frame of the live event venue using the color control pattern blending module.

3. The method of claim 1, wherein the color control pattern includes at least one zone inside the image of the live event venue.

4. The method of claim 3, wherein the color control pattern includes color data comprising of R, G, B color values, of which a color value of each color zone of the color control pattern range from 0 to 255, respectively.

5. A system for synchronizing lighting effect patterns and lighting effect control signals of a plurality of interactive lighting effect devices which are located at a second location with respect to the interactive lighting effect devices located at a first location, respectively, comprising:
   a video recorder, comprising a camera;
   a lighting controller;
   a wireless transmitter and a color control pattern blending module;
   a color control pattern extracting module;
   a wireless control module; and
   each of the interactive lighting effect devices comprising a memory having stored therein a zone region indexed by a zone code, a wireless receiver configured to capture the RF data burst from the wireless transmitter, a controller responsive to the RF data burst, and is coupled to the memory, and at least one light source disposed therein being operationally responsive to the controller to change an illuminating state therein, wherein the at least one light source comprising a plurality of light emitting diodes (LED) having at least colors of red, green and blue, and illuminating intensity of the red, green and blue LEDS are configured in accordance with red, green and blue color codes (R, G, B) ranging from 0 to 255, respectively;
   wherein a color control signal is generated and a current video frame is captured at the first location, the first location is a live event venue, the color control signal is obtained from a lighting change script of the live event venue and the current video frame containing an image comprising of a plurality of illuminated interactive lighting effect devices located at the first location, the color control signal is sent to the color control pattern blending module located at the first location by direct wire connection or by wireless transmission via RF data burst broadcasts, and a blended video frame comprising of a color control pattern blended with the current video frame of the live event venue using the color control pattern blending module is produced and transmitted to a video streaming server via internet, which in turn then transmits the blended video frame to the color control extracting module disposed at the second location, which in turn extracts the color control pattern and the color control signal from the blended video frame to control the illuminating state of the interactive lighting effect devices at the remote location to form a lighting effect pattern.

6. The system of claim 5, wherein the color control signal comprising the R, G, B color codes and the zone code.

7. The system of claim 5, wherein the second location is a remote location that is broadcasting the blended video frame, and the color control extracting module is coupled to the wireless control module at the second location for wireless transmitting the color control signal to the interactive lighting effect devices at the remote location.

8. The system of claim 5, wherein the illuminating state of the light source comprising on, off, or flashing.

9. The system of claim 5, wherein the RF data burst is replaced by wireless data bursts under Wi-Fi, Bluetooth or ZigBee.

10. The system of claim 5, wherein two or more interactive lighting effect devices that are preconfigured with the zone code stored in the memory thereof to be the same are capable of receiving the same set of pattern-related data for lighting effect to cause the light sources selectively to be illuminating in accordance with a same illuminating color data.

11. The system of claim 5, wherein the interactive lighting effect device is an illuminating LED wristband, an illuminating LED necklace, an LED bangle, a LED bracelet, a glowing head band, a glowing eyewear, a set of LED gloves, or a handheld LED glow stick.

12. A method for forming a color control pattern and extracting a color control signal for controlling illuminating state of an interactive lighting effect device so as to produce a lighting effect pattern, comprising of steps of:
- (s11) determining and configuring a geometric structure for an outline of the color control pattern;
- (s12) determining and configuring a number of illuminating panels for the color control pattern;
- (s13) allocating a portion of a blended video frame as being a scanning region in a display screen; and
- (s14) detecting the color control pattern from the blended video frame within the scanning region, and extracting the color control signal from the color control pattern using an algorithm;

wherein the number of illuminating panels is at least two panels, the scanning region is allocated by directing touching the display screen at a particular location which resides the color control pattern; step (s14) is continuously repeated to obtain more than one color control signals to thereby continuously changing illuminating states of the interactive lighting effect device until end of a lighting show.

13. The method of claim 12, wherein the algorithm for extracting of the color control signal in step (s14) comprising of a plurality of sub-steps:
- (sub-s1) determining a center point of the color control pattern having (x, y) coordinates within the span region by scanning of the geometric structure of the outline of the color control pattern, and determining a joining location of at least two segments of the illuminating panels;
- (sub-s2) configuring the joining location determined in sub-step (sub-s1) as being the center point;
- (sub-s3) scanning continuously and repeatedly for obtaining a data value for each of the illuminating panels for the color control pattern, wherein the data value is a color value, a zone code value, or an additional data value; and
- (sub-s4) converting all of the collected data values in (sub-s3), including the color value and the zone code value, to form a set of color control signal vector.

* * * * *